US012427432B2

(12) United States Patent
Shen et al.

(10) Patent No.: US 12,427,432 B2
(45) Date of Patent: Sep. 30, 2025

(54) GAME LIVE BROADCAST INTERACTION METHOD AND APPARATUS

(71) Applicant: Beijing Bytedance Network Technology Co., Ltd., Beijing (CN)

(72) Inventors: Xianchao Shen, Beijing (CN); Chenteng Wang, Beijing (CN); Yue Wang, Beijing (CN); Yue Cui, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 361 days.

(21) Appl. No.: 17/925,413

(22) PCT Filed: Jul. 28, 2021

(86) PCT No.: PCT/CN2021/109044
§ 371 (c)(1),
(2) Date: Nov. 15, 2022

(87) PCT Pub. No.: WO2022/062643
PCT Pub. Date: Mar. 31, 2022

(65) Prior Publication Data
US 2023/0182028 A1 Jun. 15, 2023

(30) Foreign Application Priority Data
Sep. 25, 2020 (CN) .......................... 202011021032.1

(51) Int. Cl.
*A63F 13/56* (2014.01)
*A63F 13/35* (2014.01)
(Continued)

(52) U.S. Cl.
CPC .............. *A63F 13/86* (2014.09); *A63F 13/35* (2014.09); *H04N 21/2187* (2013.01)

(58) Field of Classification Search
None
See application file for complete search history.

(56) References Cited

U.S. PATENT DOCUMENTS

2012/0277001 A1* 11/2012 Lansdale ................. A63F 13/44
463/39
2015/0238860 A1 8/2015 Inoue
(Continued)

FOREIGN PATENT DOCUMENTS

| CN | 105306468 A | 2/2016 |
| CN | 105791958 A | 7/2016 |

(Continued)

OTHER PUBLICATIONS

China National Intellectual Property Administration, Office Action and Search Report Issued in Application No. 202011021032.1, Jan. 7, 2022, 25 pages.
(Continued)

*Primary Examiner* — Damon J Pierce
(74) *Attorney, Agent, or Firm* — Alleman Hall & Tuttle LLP

(57) ABSTRACT

A game live-broadcast interaction method and apparatus are provided, where the method includes: receiving a game picture sent by a game server; sending the game picture to a terminal of a first user; receiving a video picture of the first user collected by the terminal, where the video picture includes a corresponding action performed by the first user according to game elements in the game picture; determining action information according to the video picture, and sending the action information to the game server, to cause the game server to control the game elements in the game picture according to the action information; merging the game picture and the video picture, and sending a picture generated by merging to a terminal for display. Therefore, (Continued)

fun of the game is increased, and user experience is improved.

15 Claims, 9 Drawing Sheets

(51) Int. Cl.
    *A63F 13/86*      (2014.01)
    *H04N 21/2187*      (2011.01)

(56) References Cited

U.S. PATENT DOCUMENTS

| | | | | |
|---|---|---|---|---|
| 2017/0304735 | A1* | 10/2017 | Shang | H04N 21/4316 |
| 2018/0295175 | A1* | 10/2018 | Smith | H04L 65/65 |
| 2019/0208230 | A1* | 7/2019 | Fan | H04N 21/2743 |
| 2020/0099960 | A1* | 3/2020 | Yu | A63F 13/86 |

FOREIGN PATENT DOCUMENTS

| | | |
|---|---|---|
| CN | 107566911 A | 1/2018 |
| CN | 107592575 A | 1/2018 |
| CN | 108905193 A | 11/2018 |
| CN | 109011574 A | 12/2018 |
| CN | 109045688 A | 12/2018 |
| CN | 109474856 A | 3/2019 |
| CN | 110149526 A | 8/2019 |
| CN | 110519612 A | 11/2019 |
| CN | 110947181 A | 4/2020 |
| CN | 111314720 A | 6/2020 |
| CN | 112153405 A | 12/2020 |

OTHER PUBLICATIONS

China National Intellectual Property Administration, Office Action and Search Report Issued in Application No. 202011021032.1, Apr. 13, 2022, 25 pages.

China National Intellectual Property Administration, Office Action and Search Report Issued in Application No. 202011021032.1, Jul. 1, 2022, 17 pages.

ISA China National Intellectual Property Administration, International Search Report Issued in Application No. PCT/CN2021/109044, Nov. 3, 2021, WIPO, 12 pages.

* cited by examiner

GAME LIVE BROADCAST INTERACTION METHOD AND APPARATUS

CROSS-REFERENCE TO RELATED APPLICATIONS

The present application is a national stage of International Application No. PCT/CN2021/109044, filed on Jul. 28, 2021, which claims priority to Chinese patent application No. 202011021032.1, filed on Sep. 25, 2020. The disclosures of the aforementioned applications are hereby incorporated by reference in their entireties.

TECHNICAL FIELD

Embodiments of the present disclosure relate to the technical field of game live-broadcast, and in particular, to a game live-broadcast interaction method and apparatus.

BACKGROUND

With the development of online game technology, more and more games have been developed and become a way of leisure and entertainment for people. At the same time, in order to meet the needs of more game lovers, game live-broadcast has become a very popular way of game interaction. In other words, game pictures manipulated by multiple players and a video picture of a streamer are combined into one picture and displayed on a terminal, and voice information of the streamer is collected and played on the terminal.

In related arts, in a process of game live-broadcast, only game players can manipulate the game, and the streamer can only give voice comments during the process of game live-broadcast.

However, such a single form of game live-broadcast interaction reduces fun of the game, and influences user experience.

SUMMARY

Embodiments of the present disclosure provide a game live-broadcast interaction method and apparatus, to address the problem that fun of the game is reduced and user experience is influenced due to the single form of game live-broadcast interaction in prior art.

In a first aspect, an embodiment of the present disclosure provides a game live-broadcast interaction method, including:
  receiving a game picture sent by a game server;
  sending the game picture to a terminal of a first user;
  receiving a video picture of the first user collected by the terminal, where the video picture includes a corresponding action performed by the first user according to game elements in the game picture;
  determining action information according to the video picture, and sending the action information to the game server, to cause the game server to control the game elements in the game picture according to the action information;
  merging the game picture and the video picture, and sending a picture generated by merging to a terminal for display.

In a second aspect, an embodiment of the present disclosure provides a game live-broadcast interaction method, including:
  sending a game picture to an audio-video processing module, to cause the audio-video processing module to receive the game picture and send the game picture to a terminal;
  receiving action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture; and
  controlling the game elements according to the action information.

In a third aspect, an embodiment of the present disclosure provides a game live-broadcast interaction apparatus, including:
  a first receiving module, configured to receive a game picture sent by a game server;
  a first sending module, configured to send the game picture to a terminal of a first user;
  the first receiving module further configured to receive a video picture of the first user collected by the terminal, where the video picture includes a corresponding action performed by the first user according to game elements in the game picture;
  a determining module, configured to determine action information according to the video picture, the first sending module further configured to send the action information to the game server, to cause the game server to control the game elements in the game picture according to the action information;
  the first sending module further configured to merge the game picture and the video picture, and send a picture generated by merging to a terminal for display.

In a fourth aspect, an embodiment of the present disclosure provides a game live-broadcast interaction apparatus, including:
  a second sending module, configured to send a game picture to an audio-video processing module, to cause the audio-video processing module to receive the game picture and send the game picture to a terminal;
  a second receiving module, configured to receive action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture; and
  a controlling module, configured to control the game elements according to the action information.

In a fifth aspect, an embodiment of the present disclosure provides an electronic device, including: at least one processor and a memory;
  the memory stores a computer-executable instruction;
  the at least one processor executes the computer-executable instruction stored in the memory, to cause the at least one processor to perform the game live-broadcast interaction method according to the first aspect and various possible designs thereof or the game live-broadcast interaction method according to the second aspect and various possible designs thereof.

In a sixth aspect, an embodiment of the present disclosure provides a computer-readable storage medium, where the computer-readable storage medium stores a computer-executable instruction, and when a processor executes the computer-executable instruction, the game live-broadcast interaction method according to the first aspect and various possible designs thereof, or the game live-broadcast interaction method according to the second aspect and various possible designs thereof is implemented.

In a seventh aspect, an embodiment of the present disclosure provides a computer program product, including a computer program carried on a computer-readable storage medium, and when the computer program is executed by a processor, the game live-broadcast interaction method according to the first aspect and various possible designs thereof, or the game live-broadcast interaction method according to the second aspect and various possible designs thereof is implemented.

In an eighth aspect, an embodiment of the present disclosure provides a computer program, and when the computer program is executed by a processor, the game live-broadcast interaction method according to the first aspect and various designs thereof, or the game live-broadcast interaction method according to the second aspect and various designs thereof is performed.

Embodiments of the present disclosure provides a game live-broadcast interaction method and apparatus, and according to the method, a game picture sent by a game server is received, and the game picture is sent to a terminal of a first user, and thus the first user can perform a corresponding action according to game elements in the game picture in the terminal; and then a video picture of the first user collected by the terminal is received, and action information of the corresponding action performed by the first user is determined according to the video picture, and the action information is sent to the game server, to cause the game server to control the game elements in the game picture according to the action information, and thus an effect that multiple first users participate in manipulation of the game is realized, which increases fun of game interaction; and finally the game picture and the video picture are merged and sent to a user terminal for display, and in such a way the user can view a picture where multiple first users manipulate the game, which improves user experience.

BRIEF DESCRIPTION OF DRAWINGS

In order to more clearly describe the embodiments of the present disclosure or the technical solutions in the prior art, the following will briefly describe the drawings that need to be used in the description of the embodiments or the prior art. Obviously, the drawings in the following description are some embodiments of the present disclosure. For those of ordinary skills in the art, other drawings may also be obtained according to these drawings without making creative efforts.

DESCRIPTION OF EMBODIMENTS

Figure 1:
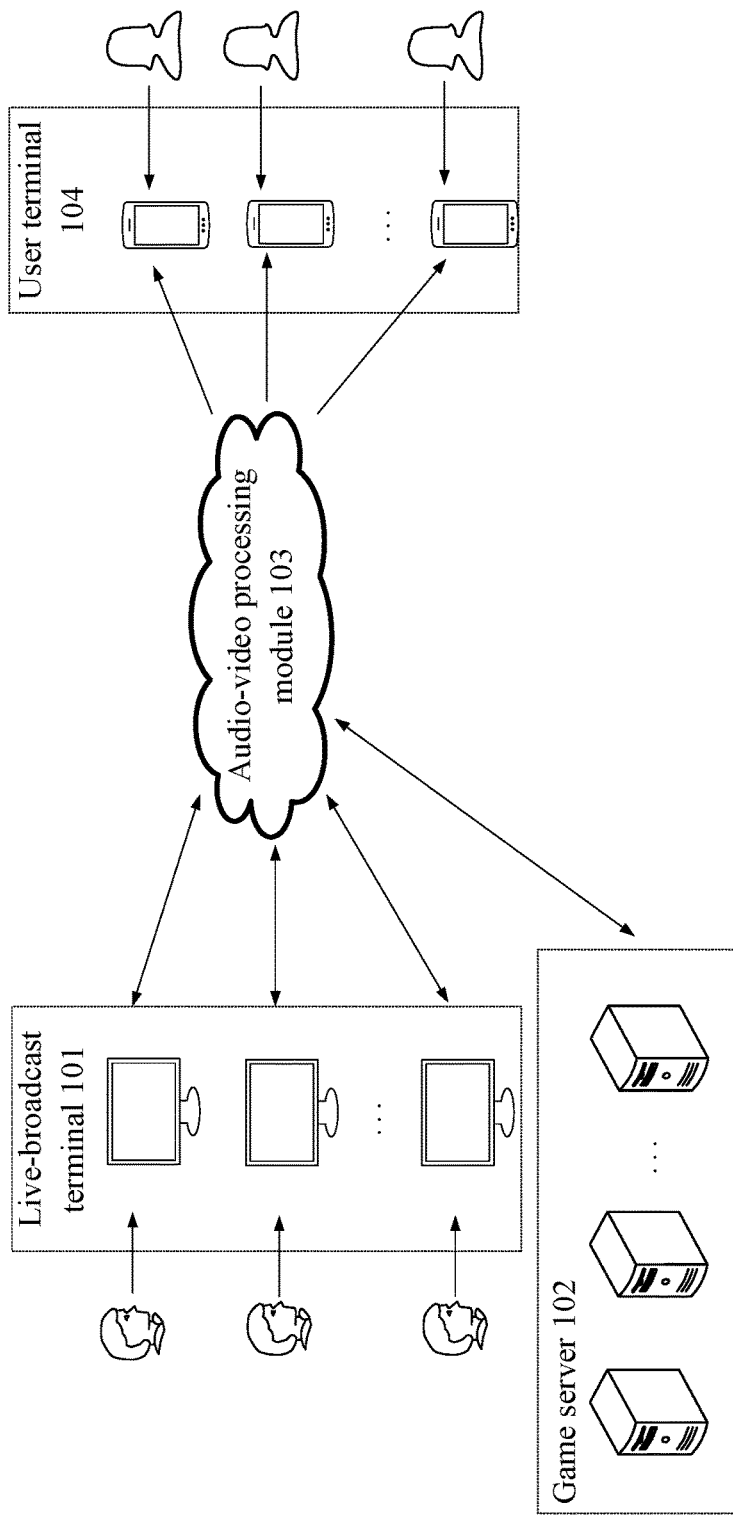
FIG. 1 is an application scenario diagram of a game live-broadcast interaction method provided by an embodiment of the present disclosure.

In order to make the purpose, technical solution and advantages of the embodiments of the present disclosure clearer, the technical solution in the embodiments of the present disclosure will be clearly and completely described below with reference to the drawings in the embodiments of the present disclosure. Obviously, the described embodiments are part of the embodiments of the present disclosure, but not all of the embodiments. Based on the embodiments in the present disclosure, all other embodiments obtained by those of ordinary skills in the art without making creative efforts belong to the scope of protection of the present disclosure.

With the development of online game technology, more and more games have been developed and become a way of leisure and entertainment for people. At the same time, in order to meet the needs of more game lovers, game live-broadcast has become a very popular way of game interaction. In other words, game pictures manipulated by multiple players and a video picture of a streamer are combined into one picture and displayed on a terminal, and voice information of the streamer is collected and played on the terminal.

In related arts, in a process of game live-broadcast, only game players can manipulate the game, and the streamer can only give voice comments during the process of game live-broadcast, but cannot participate in game manipulation at the same time. What is viewed by audience at last is only a game picture manipulated by players and a profile photo of the streamer, and voice comment of the streamer can be heard. However, such a single form of game live-broadcast interaction reduces fun of the game, and influences user experience.

Regarding such deficiency, technical concepts of the embodiments of the present disclosure mainly include: game programs are all running in a game server, the game server sends a game picture to an audio-video processing module, the audio-video processing module sends the game picture to at least one live-broadcast terminal respectively, and each live-streamer performs a corresponding action according to the game picture displayed on his or her live-broadcast terminal, the live-broadcast terminal collects video pictures of the live-streamer in real time, and sends the video pictures to the audio-video processing module, the audio-video processing module obtains action information of each live-streamer by processing the video pictures of each live-streamer, and sends the action information of each live-streamer to the game server, and the game server controls game elements in the game picture according to the action information of each live-streamer, thereby realizing an effect that the live-streamers participate in the game manipulation; then the audio video processing module merges the game picture and video pictures of respective live-streamers, and sends to the audience, so that the audience can view a game interaction process of multiple live-streamers, thereby increasing fun and improving audience experience.

FIG. 1 is an application scenario diagram of a game live-broadcast interaction method provided by an embodiment of the present disclosure.

As shown in FIG. 1, basic architecture of the application scenario diagram provided by the present embodiment mainly includes: at least one live-broadcast terminal 101, a game server 102, an audio-video processing module 103 and at least one user terminal 104; where the live-broadcast terminal sends a game connection request to the audio-video processing module, and the audio-video processing module matches up a corresponding other live-broadcast terminal according to the game connection request, so that at least one streamer enters a same room; a game program is running in a game server; the audio-video processing module is further configured to process the game picture in the game server and the video picture of the live-streamer collected by the live-broadcast terminal, and finally merges the game picture and the video picture and sends to a user terminal.

Figure 2:
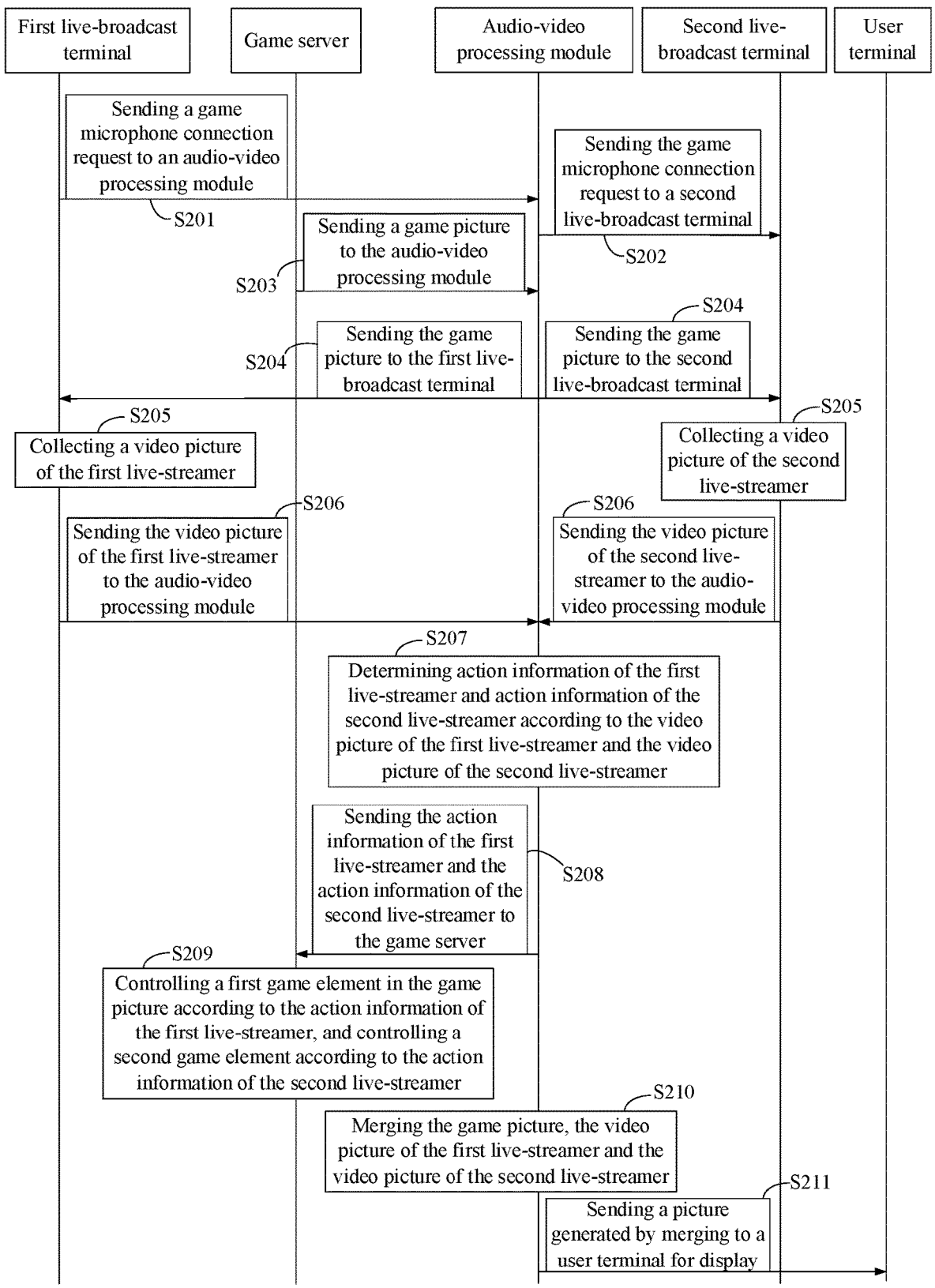
FIG. 2 is a signaling flowchart of a game live-broadcast interaction method provided by an embodiment of the present disclosure.

FIG. 2 is a signaling flowchart of a game live-broadcast interaction method provided by an embodiment of the present disclosure. The embodiment of the present disclosure takes four-side interaction of a live-broadcast terminal, a game server, an audio-video processing module and a user terminal as an example to describe the game live-broadcast interaction method.

It shall be noted that the number of the live-broadcast terminal may be one or more, which is not limited by the embodiments of the present disclosure. But for convenience of description, the embodiment of the present disclosure takes two live-broadcast terminals as an example for description.

As shown in FIG. 2, the game live-broadcast interaction method provided by the embodiment of the present disclosure may include following steps.

S201, a first live-broadcast terminal sends a game connection request to an audio-video processing module.

Specifically, when a first live-streamer intends to establish connection with a second live-streamer to live-broadcast a game, the first live-streamer can input game connection information to the first live-broadcast terminal (for example, clicking a profile photo or a screen name of the second live-streamer), and the first live-broadcast terminal generates the game connection request after detecting the operation of the first live-streamer, and sends the game connection request to the audio-video processing module.

S202, the audio-video processing module sends the game connection request to a second live-broadcast terminal.

Figure 3A:
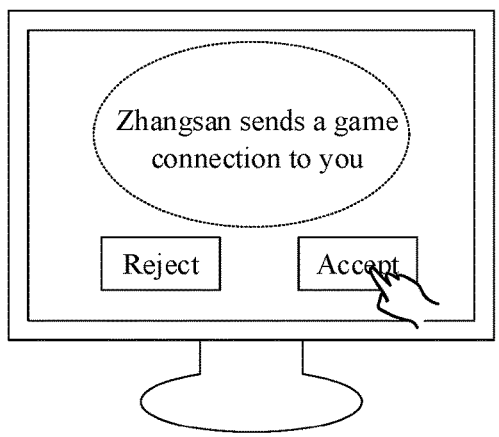
FIG. 3A to FIG. 3B are example diagrams of displaying of a game connection interface provided by an embodiment of the present disclosure.
Figure 3B:
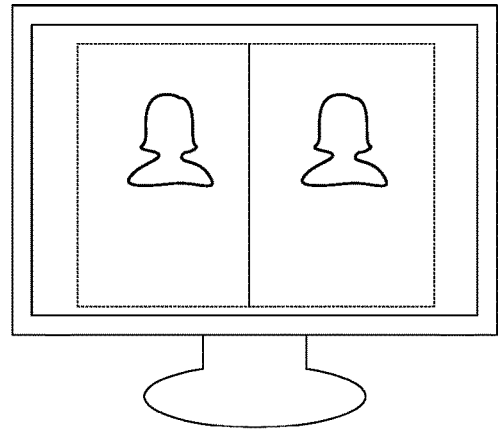

Specifically, after the audio-video processing module sends the game connection request to the second live-broadcast terminal, the second live-streamer will receive a game connection notification, for example, as shown in FIG. 3A, a terminal interface displays "Zhangsan sends a game connection to you", and also displays two operation windows of "Accept" and "Reject", and when the second live-streamer clicks "Accept", the game connection is successfully established. After the game connection is successfully established, the audio-video processing module sends the video picture of the first live-streamer collected by the first live-broadcast terminal to the second live-broadcast terminal, and sends the video picture of the second live-streamer collected by the second live-broadcast terminal to the first live-broadcast terminal, so that both sides can view each other's video picture, and a picture finally displayed on the live-broadcast terminal after the connection is successfully established is shown in FIG. 3B.

S203, a game server sends a game picture to the audio-video processing module.

Specifically, a game program is running in the game server, and the game picture is rendered by a display chip (Graphics Processing Unit, GPU) in the game server, and the game picture is sent to the audio-video processing module.

S204, the audio-video processing module sends the game picture to the first live-broadcast terminal and the second live-broadcast terminal respectively.

Specifically, after receiving the game picture sent by the game server, the audio-video processing module sends the game picture to the first live-broadcast terminal and the second live-broadcast terminal respectively, so that live-streamers can view the game picture in display interfaces of their respective live-broadcast terminals, and the live-streamers can perform corresponding actions according to game elements in the game picture.

In an embodiment of the present disclosure, one game server runs one game at a same time period, and the game server sends the game picture corresponding to the one game to the audio-video processing module, and the audio-video processing module sends the game picture to the two live-broadcast terminals, so that two live-streamers can play the same game at the same time. Alternatively, multiple game servers run different game programs at a same time period, and the multiple game servers send game pictures of their respective running games to the audio-video processing module, and the audio-video processing module sends different game pictures to different live-broadcast terminals, so that multiple live-streamers can play different games at the same time.

S205, the first live-broadcast terminal collects the video picture of the first live-streamer, and the second live-broadcast terminal collects the video picture of the second live-streamer; where the video picture includes a corresponding action performed by the live-streamer according to the game elements in the game picture.

Specifically, a camera of the live-broadcast terminal collects the video picture of the live-streamer in real time, and since the live-streamer performs corresponding actions according to the game elements in the game picture displayed by the live-broadcast terminal after the game picture is sent to the live-broadcast terminal, the video picture collected by the live-broadcast terminal includes a corresponding action performed by the live-streamer according to the game elements in the game picture, for example, actions of the live-streamer like blinking, opening mouth, shaking head, moving of the head image, etc.

S206, the first live-broadcast terminal sends the video picture of the first live-streamer to the audio-video processing module, and the second live-broadcast terminal sends the video picture of the second live-streamer to the audio-video processing module.

S207, the audio-video processing module determines action information of the first live-streamer and action information of the second live-streamer, respectively, according to the video picture of the first live-streamer and the video picture of the second live-streamer.

In steps S206 and S207, after receiving the video pictures of the live-streamers sent by the two live-broadcast terminals, the audio-video processing module processes the video pictures to obtain the action information of the live-streamers.

Illustratively, the audio-video processing module collects head image coordinates of the live-streamers in the video pictures in real time, and determines movement action information of the live-streamers according to the head image coordinates at different moments.

It shall be noted that, a specific process of determining the action information according to the video picture will be described in detail in the subsequent related embodiments.

S208, the audio-video processing module sends the action information of the first live-streamer and the action information of the second live-streamer to the game server.

Specifically, after the action information of the live-streamers is determined, the action information is sent to the game server, for example, head image coordinate information of the live-streamers in the collected video pictures at different moments is sent to the game server.

S209, the game server controls a first game element in the game picture according to the action information of the first live-streamer, and controls a second game element according to the action information of the second live-streamer.

Specifically, the game server controls, according to the action information of the live-streamers, the game elements in the game picture to perform actions indicated by the action information.

For example, after receiving the head image coordinates of a live-streamer sent by the audio-video processing module, the game server determines a movement direction of the head of the live-streamer according to the coordinates at different moments, and if it is determined that the head of the live-streamer is moving upward, the game server controls the head of a corresponding game element to move upward.

S210, the audio-video processing module merges the game picture, the video picture of the first live-streamer and the video picture of the second live-streamer.

S211, the audio-video processing module sends a picture generated by merging to a user terminal for display.

Specifically, the audio-video processing module superimposes the game picture onto the video pictures of the two live-streamers in connection to obtain a merged picture, and sends the merged picture to the user terminal for display.

Under a circumstance of the present embodiment, the audio-video processing module may merge the video pictures of the two live-broadcast terminals first, and then send a merged video stream and a game stream to the user terminal respectively and separately, and the merged video and the game picture can be superimposed to display when being displayed by the user terminal.

Under a circumstance of the present embodiment, if the audio-video processing module merges the video pictures of the two live-broadcast terminals first, and then sends a merged video stream and a game stream to the user terminal respectively and separately, the user terminal may display the merged video and the game picture in a split screen.

In the embodiment of the present disclosure, after two live-broadcast terminals establish the game connection, the game server sends a game picture to an audio-video processing module, the audio-video processing module sends the game picture to the two live-broadcast terminals respectively, and the two live-streamers perform corresponding actions according to the game picture displayed on their respective live-broadcast terminals; the live-broadcast terminals collect video pictures of the live-streamers in real time, and send the video pictures to the audio-video processing module; the audio-video processing module obtains action information of each live-streamer by processing the video picture of each live-streamer, and sends the action information of each live-streamer to the game server, and the game server controls game elements in the game picture according to the action information of each live-streamer, thereby realizing an effect that two live-streamers participate in the game manipulation at the same time; then the audio-video processor merges the game picture and the video picture of each live-streamer, and sends to the audience side, so that the audience can view a game interaction process of multiple live-streamers, thereby increasing fun and improving audience experience.

In order to better understand the present disclosure, a detailed process of the game live-broadcast interaction method will be described from the audio-video processing module side and the game server side respectively.

Figure 4:
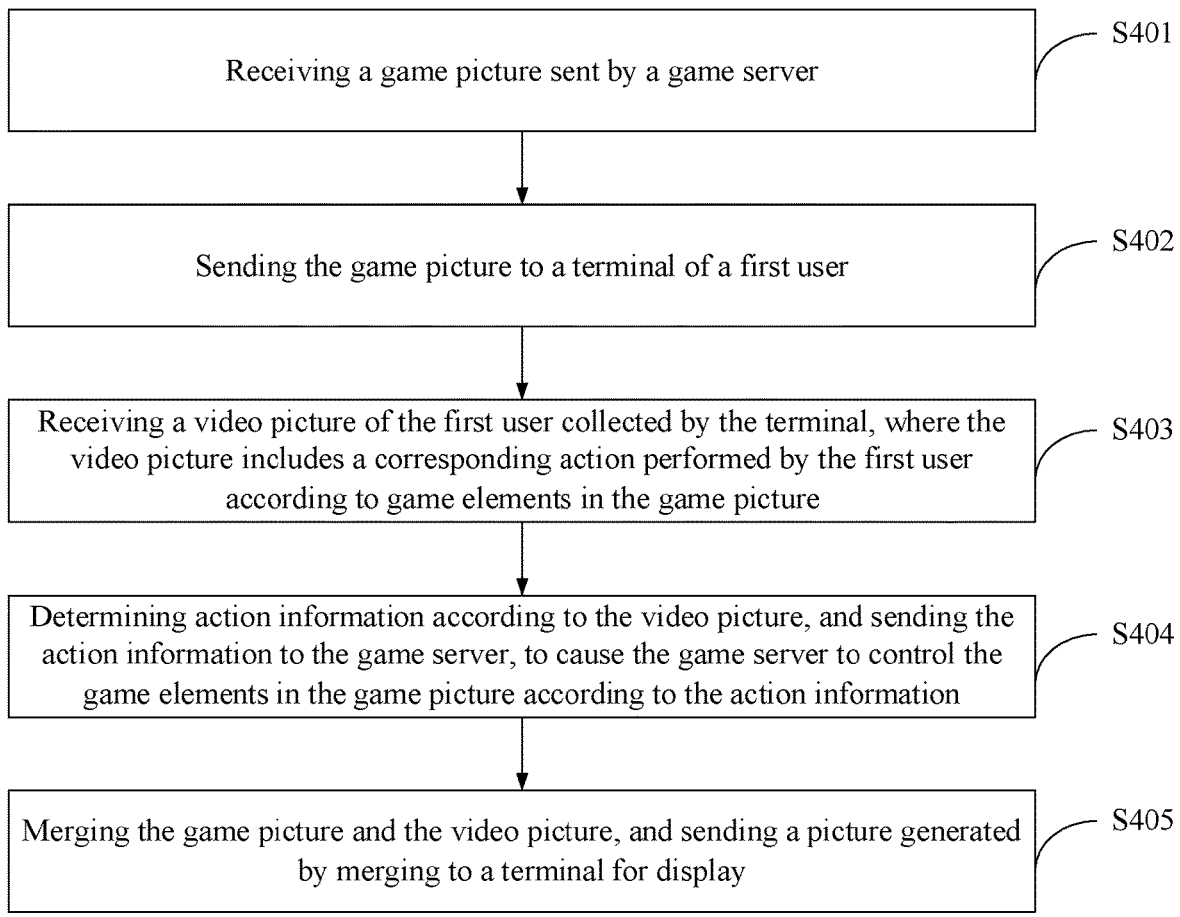
FIG. 4 is a first schematic flowchart of a game live-broadcast interaction method provided by an embodiment of the present disclosure.

FIG. 4 is a first schematic flowchart of a game live-broadcast interaction method provided by an embodiment of the present disclosure. The present embodiment takes operation of the audio-video processing module side as an example to describe the game live-broadcast interaction method in detail.

As shown in FIG. 4, the method provided by the present embodiment may include the following steps.

S401, receiving a game picture sent by a game server.

Specifically, a game program is running in the game server, and the game picture is rendered by a display chip (Graphics Processing Unit, GPU) in the game server, and the game picture is sent to the audio-video processing module.

Under a circumstance of the present embodiment, the game picture may be a game picture sent by the same game server, or multiple different game pictures sent by multiple game servers. How many game pictures are sent by the game server, and whether to send different game pictures are determined according to selection of the live-streamer at the live-broadcast terminal.

For example, there are two live-streamers live-broadcasting in connection, and the two live-streamers may select a same game, and send the selection results to the audio-video processing module, and the audio-video processing module sends the selection results to the game server, and the game server sends the game picture of the game to an audio-video processing module according to the selection results. Alternatively, the two live-streamers may select two different games, and the selection results of the two live-streamers are sent by the audio-video processing module to two servers running corresponding games respectively, and the two game servers send corresponding game pictures to the audio-video processing module respectively in real time.

S402, sending the game picture to a terminal of a first user.

The first user may be at least one live-streamer, and the terminal is the live-broadcast terminal corresponding to each live-streamer, and the live-broadcast terminal may be a terminal device such as a cell phone, a tablet, etc.

Under a circumstance of the present embodiment, if the two live-streamers select a same game, the game picture of the game is sent to the live-streamers simultaneously, so that the live-streamers simultaneously manipulate different game elements in the game. If the two live-streamers select different games, the audio-video processing module sends the game pictures to the live-broadcast terminals of corresponding live-streamers respectively in real time, so that the two live-streamers simultaneously manipulate game elements in their respective selected games.

S403, receiving a video picture of the first user collected by the terminal, where the video picture includes a corresponding action performed by the first user according to game elements in the game picture.

Specifically, a camera of the live-broadcast terminal collects video pictures of the live-streamer in real time, and since the live-streamer performs a corresponding action according to the game elements in the game picture displayed by the live-broadcast terminal after the game picture is sent to the live-broadcast terminal, the video picture collected by the live-broadcast terminal includes a corresponding action performed by the live-streamer according to the game elements in the game picture, for example, actions of the live-streamer like blinking, opening mouth, shaking head, moving of the head image, etc.

S404, determining action information according to the video picture, and sending the action information to the game server, to cause the game server to control the game elements in the game picture according to the action information.

Specifically, after receiving the video pictures of the live-streamers collected and sent by the two live-broadcast terminals, the audio-video processing module processes the video pictures so as to obtain the action information of the live-streamers.

Illustratively, the audio-video processing module collects head image coordinates of the live-streamers in video pictures in real time, and determines movement action information of the live-streamers according to the head image coordinates at different moments.

S405, merging the game picture and the video picture, and sending a picture generated by merging to a terminal for display.

Specifically, the audio-video processing module superimposes the game picture onto the video pictures of the two live-streamers in connection, and sends the merged picture to the terminals of the live-streamers and the terminals of audience for display.

Under a circumstance of the present embodiment, the audio-video processing module may merge the video pictures of the two live-broadcast terminals first, and then send a video stream and a game stream to a user terminal independently, and the video and game pictures are superimposed for display when being displayed by the user terminal.

In the embodiments of the present disclosure, a game picture sent by a game server is received, and the game picture is sent to a live-broadcast terminal of a live-streamer, and thus the live-streamer can perform a corresponding action according to game elements in the game picture in the live-broadcast terminal; and then a video picture of the live-streamer collected by the live-broadcast terminal is received, and action information of the corresponding action performed by the live-streamer is determined according to the video picture, and the action information is sent to the game server, to cause the game server to control the game elements in the game picture according to the action information, thereby realizing an effect that multiple live-streamers participate in manipulating the game, which improves fun of game interaction; and finally the game picture and the video picture are merged and sent to the user terminal for display, and in such a way the user can view a picture where multiple live-streamers manipulate the game, which improves user experience.

In an embodiment of the present disclosure, the determining the action information according to the video picture includes: collecting limb position information of the live-streamer at a preset time interval to obtain a coordinate sequence of limbs of the live-streamer in video pictures.

The time interval may be set according to actual needs, for example, the time interval is 0.1 second, and position information of one live-streamer is collected every 0.1 second. It shall be noted that, to make the collected action information of the live-streamer smoother, the time interval shall be as small as possible.

Figure 5:
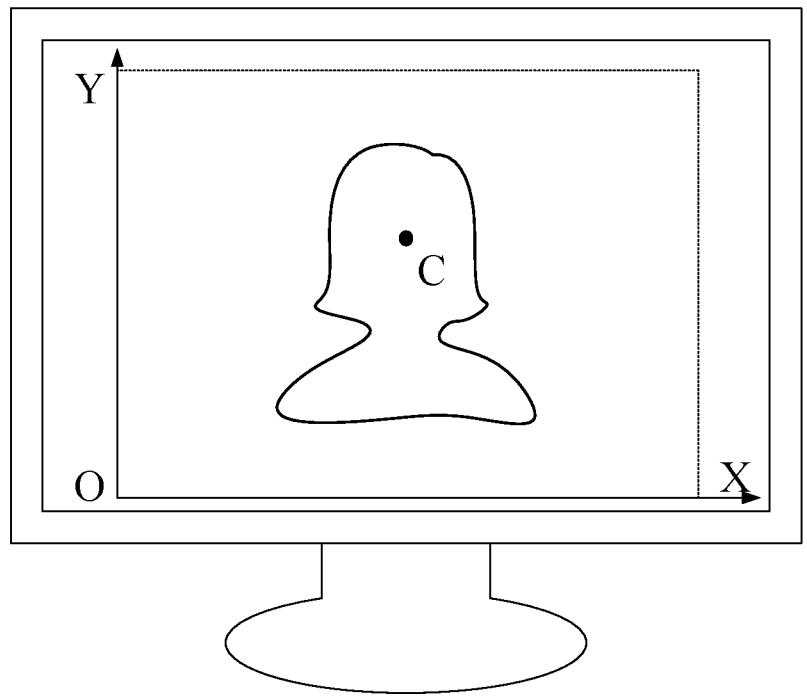
FIG. 5 is a first example diagram of displaying of a live-broadcast interface provided by an embodiment of the present disclosure.

Specifically, as shown in FIG. 5, the head of the live-streamer is taken as an example, and the lower edge of the entire video picture is a horizontal axis X, and the left edge is a vertical axis Y, the end point in the lower-left corner is the origin O, and the head image coordinates in the video picture are collected every 0.1 second, and a coordinate sequence of the head image position of the live-streamer is finally obtained, which is denoted by: $(X1, Y1), (X2, Y2), \ldots, (Xn, Yn)$. A collection point of the coordinates may be a point at the center position of the head image, or may be a point of a certain part of the head image, and each pair of coordinates in the coordinate sequence is a pair of coordinates of the same collection point at different moments. As shown in FIG. 5, the center point C of the head image may be taken as the coordinate collection point.

In the above method, the coordinate sequence of the head image of the first live-streamer A, which is denoted as $(AX1, AY1), \ldots, (AXn, AYn)$, and the coordinate sequence of the head image of the second live-streamer B, which is denoted as $(BX1, BY1), \ldots, (BXn, BYn)$, are obtained respectively.

In an embodiment of the present disclosure, the sending the action information to the game server to cause the game server to control the game elements in the game picture according to the action information includes: sending the coordinate sequence of the limbs of the live-streamer relative to the video picture to the game server, to cause the game server to determine motion trajectories of the game elements according to the coordinate sequence.

Specifically, the collected respective head image coordinate sequences of the first live-streamer and the second live-streamer are sent to the game server, and the game server determines a movement direction and a movement distance of the heads of the two live-streamers, so as to control the movement direction and the movement distance of the game elements in the game picture.

For example, an abscissa of the head of the first live-streamer is 5 at a moment of 10 second, and is 6 at a moment of 10.1 second, and it is indicated that the head of the first live-streamer moves to the right by 1 unit, and then the game server controls a head of a corresponding game element in the game picture to move to the right by one unit.

In an embodiment of the present disclosure, the determining the action information according to the video picture includes: detecting status information of a target part of the live-streamer.

The video picture of the live-streamer may include parts such as mouth, eyes, nose, etc., and the status information may be a mouth-opened status, a mouth-closed status, an eyes-opened status and an eyes-closed status, etc.

Figure 6:
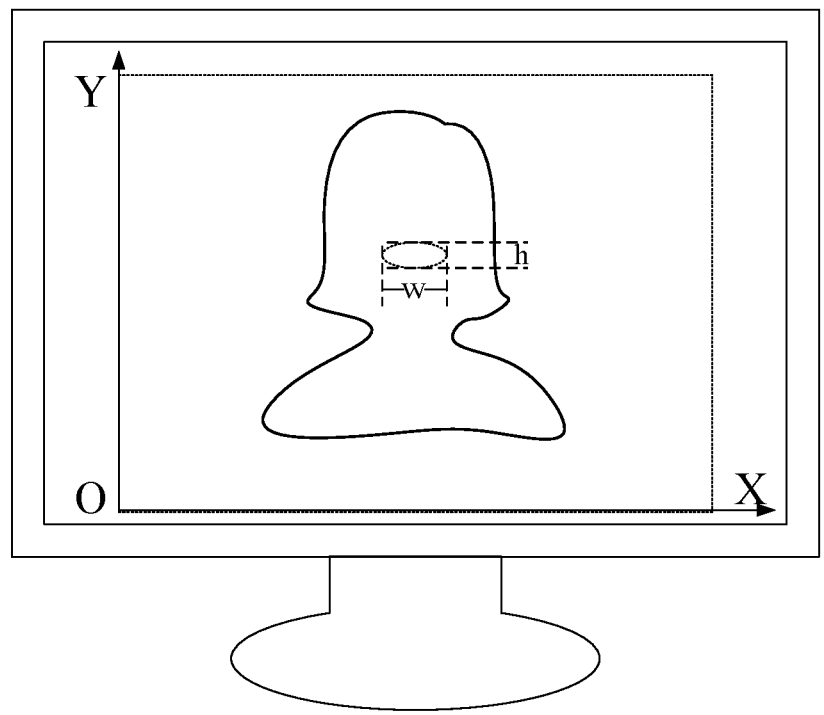
FIG. 6 is a second example diagram of displaying of a live-broadcast interface provided by an embodiment of the present disclosure.

Specifically, as shown in FIG. 6, boundary coordinates of the target part may be collected, and information such as height h, width w and area of the target part may be calculated according to the boundary coordinates. A status of the target part is determined according to the information obtained by calculation. For example, it is assumed that the height of the mouth in a normal closed status is 6, and a 10-unit height of the mouth is obtained by calculating the boundary coordinates of the mouth, then it is indicated that the mouth of the live-streamer is in a opened status.

Under a circumstance of the present embodiment, the sending the action information to the game server to cause the game server to control the game elements in the game picture according to the action information includes: sending the status information of the target part of the live-streamer to the game server, to cause the game server to control, according to the status information of the target part, the game element to perform an action indicated by the status information.

Specifically, after receiving the status information of the target part, the game server controls, according to the status information of the target part, the game element to perform the action indicated by the status information.

For example, in a game named Snake, it is detected that the status of the mouth of the first live-streamer is in the opened status, and then a mouth part of the snake is controlled to open.

In an embodiment of the present disclosure, the merging the game picture and the video picture includes: extracting the game elements in the game picture; and superimposing the game elements and the video picture.

Under a circumstance of the present embodiment, the extracting the game elements in the game picture includes: setting a background color of the game picture as a preset color; and extracting elements with a different color from the preset color in the game picture as the game elements.

Specifically, in the video merging process, only game elements in the game picture are extracted, and the background color of the game is set as BColor, and the parts of the game elements are other elements with a different color from the background color, and the game elements are superimposed in the video picture of the live-streamer by taking BColor as an alpha channel during superimposing.

Figures 7A, 7B:
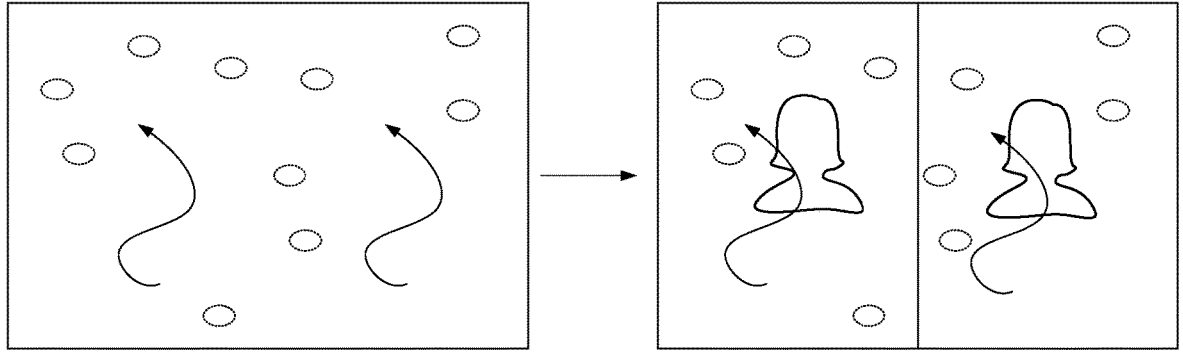
FIG. 7A to FIG. 7B are first example diagrams of displaying of a video merging interface provided by an embodiment of the present disclosure.

For example, in the game named Snake, the background color of the game picture is set as BColor, as shown in FIG. 7A, and only game elements of a snake and foods are extracted. Then the game elements are directly superimposed on the images of the live-streamers in connection, and the superimposed images are shown as FIG. 7B.

In an embodiment of the present disclosure, the number of the live-broadcast terminals is at least two; and the method further includes: receiving a game connection request sent by a first live-broadcast terminal; and matching up at least one other live-broadcast terminal according to the game connection request.

Specifically, when a first live-streamer intends to establish connection with a second live-streamer to live-broadcast a game, the first live-streamer may input game connection information in the first live-broadcast terminal (for example, clicking a profile photo or a screen name of the second live-streamer), and the first live-broadcast terminal generates the game connection request after detecting the operation of the first live-streamer, and sends the game connection request to the audio-video processing module. The audio-video processing module sends the game connection request to a second live-broadcast terminal, and after the live-streamer corresponding to the second live-broadcast terminal accepts the request, both sides enter a same game live-broadcast room.

Figure 8:
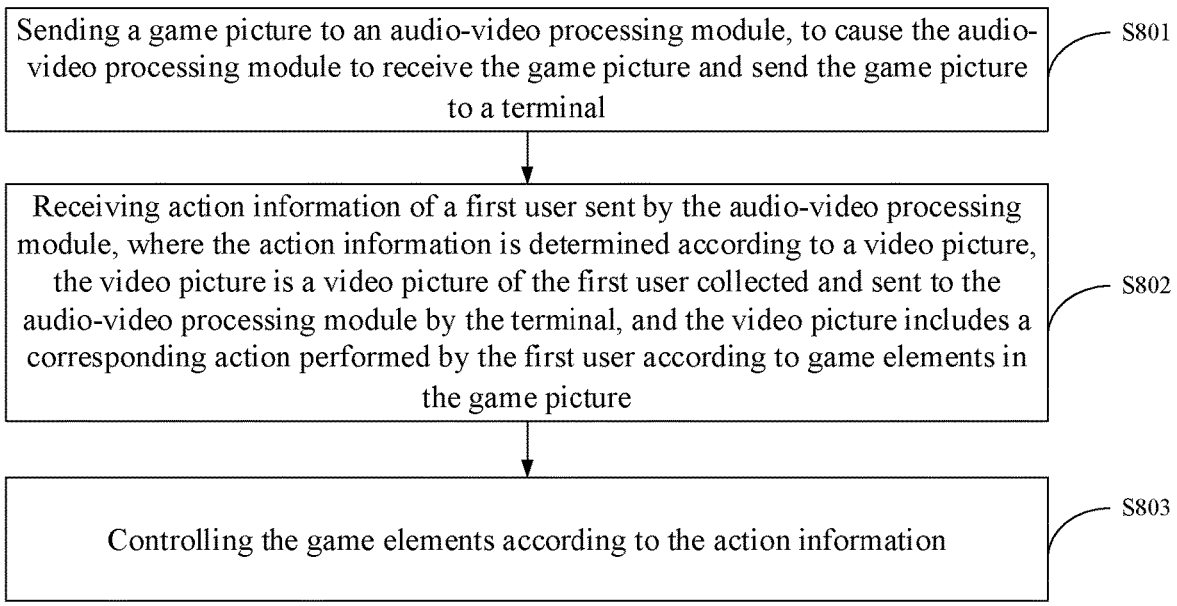
FIG. 8 is a second schematic flowchart of a game live-broadcast interaction method provided by an embodiment of the present disclosure.

FIG. 8 is a second flowchart of a game live-broadcast interaction method provided by an embodiment of the present disclosure. The present embodiment takes operation of the game server side as an example, to describe the game live-broadcast interaction method in detail.

As shown in FIG. 8, the method provided by the present embodiment may include the following steps.

S801, sending a game picture to an audio-video processing module to cause the audio-video processing module to receive the game picture and send the game picture to a terminal.

S802, receiving action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture.

S803, controlling the game elements according to the action information.

In an embodiment of the present disclosure, the method further includes: receiving a coordinate sequence of limbs of the first user relative to the video picture sent by the audio-video processing module, where the coordinate sequence is obtained by the audio-video processing module through collecting limb position information of the first user according to the video picture at a preset time interval; and determining motion trajectories of the game elements according to the coordinate sequence of the limbs of the first user relative to the video picture.

In an embodiment of the present disclosure, the determining motion trajectories of the game elements according to the coordinate sequence of the limbs of the first user relative to the video picture includes: calculating a difference between an abscissa at a latter moment and an abscissa at a previous moment respectively, to obtain horizontal movement information of the limbs of the first user, where the horizontal movement information includes a horizontal movement distance and a horizontal movement direction, and, calculating a difference between an ordinate at a latter moment and an ordinate at a previous moment respectively, to obtain vertical movement information of the limbs of the first user, where the vertical movement information includes a vertical movement distance and a vertical movement direction; and determining the motion trajectories of the game elements according to the horizontal movement information and the vertical movement information.

Specifically, heads of the two live-streamers are taken as an example, a received coordinate sequence of the head image of the first live-streamer A sent by the audio-video processing module is $(AX_1, AY_1), \ldots, (AX_n, AY_n)$, and a coordinate sequence of the head image of the second live-streamer is $(BX_1, BY_1), \ldots, (BX_n, BY_n)$. The game server calculates a difference between an abscissa at a latter moment and an abscissa at a previous moment, and the formula for calculation is: $deltaAX_n = AX_n - AX_{(n-1)}$; where $deltaAX_n$ represents horizontal movement information of the head of the first live-streamer A, and if $deltaAX_n$ is positive, it represents that the head of the first live-streamer A horizontally moves to the right, and a value of $deltaAX_n$ is a distance of the movement to the right; if $deltaAX_n$ is negative, it represents that the head of the first live-streamer A horizontally moves to the left, and an absolute value of deltaAXn is a distance of the movement to the left; if deltaAXn is 0, it represents there is no horizontal movement. Similarly, vertical movement information of the head of the first live-streamer A is calculated through the formula deltaAYn=AYn−AY(n−1), and if deltaAYn is positive, it represents that the head of the first live-streamer A moves upward, and a value of deltaAYn is a distance of the upward movement of the head; and if deltaAYn is negative, it represents that the head of the first live-streamer A moves downward, and an absolute value of deltaAYn is a distance of the downward movement of the head.

Similarly, movement information of the head of a second live-streamer B is obtained, which is deltaBXn=BXn−BX(n−1) and deltaBYn=BYn−BY(n−1) respectively.

Then the game server controls a first game element corresponding to the first live-streamer to move according to deltaAXn and deltaAYn respectively, and the movement direction and distance are consistent with those indicated by deltaAXn and deltaAYn. For example, if deltaAYn is greater than 0, the game server controls the first game element to move upward by deltaAYn units; and if deltaAYn is smaller than 0, the game server controls the first game element to move downward by |deltaAYn| units. Similarly, the game server controls a second game element to move according to deltaBXn and deltaBYn respectively.

Under a circumstance of the present embodiment, the method further includes: receiving status information of a target part of the live-streamer sent by the audio-video processing module; and controlling, according to the status information of the target part, the game element to perform an action indicated by the status information.

The video picture of the live-streamer may include parts such as mouth, eyes, nose, etc., and the status information may be a mouth-opened status, a mouth-closed status, an eyes-opened status and an eyes-closed status, etc.

Specifically, as shown in FIG. 6, boundary coordinates of the target part may be collected, and information such as height h, width w and area of the target part may be calculated according to the boundary coordinates. A status of the target part is determined according to the information obtained by calculation. For example, it is assumed that the height of the mouth in a normal closed status is 6, and a 10-unit height of the mouth is obtained by calculating the boundary coordinates of the mouth, then it represents that the mouth of the live-streamer is in an opened status. The game server controls, according to the status information, the game element to perform the action indicated by the status information. For example, in the game named Snake, it is detected that the status of the mouth of the first live-streamer is in the opened status, and then a mouth part of the snake is controlled to open.

In order to better understand the process of live-streamers participating in the manipulation of a game, the game of Snake is taken as an example for description in the following.

It shall be noted that, for convenience of description, the first game element correspondingly manipulated by the first live-streamer is determined as snake A, and the second game element manipulated by the second live-streamer is determined as snake B. In practical implementation, which game element is manipulated by a live-streamer may be set by the live-streamer himself, which is not particularly limited here.

Figure 9A:
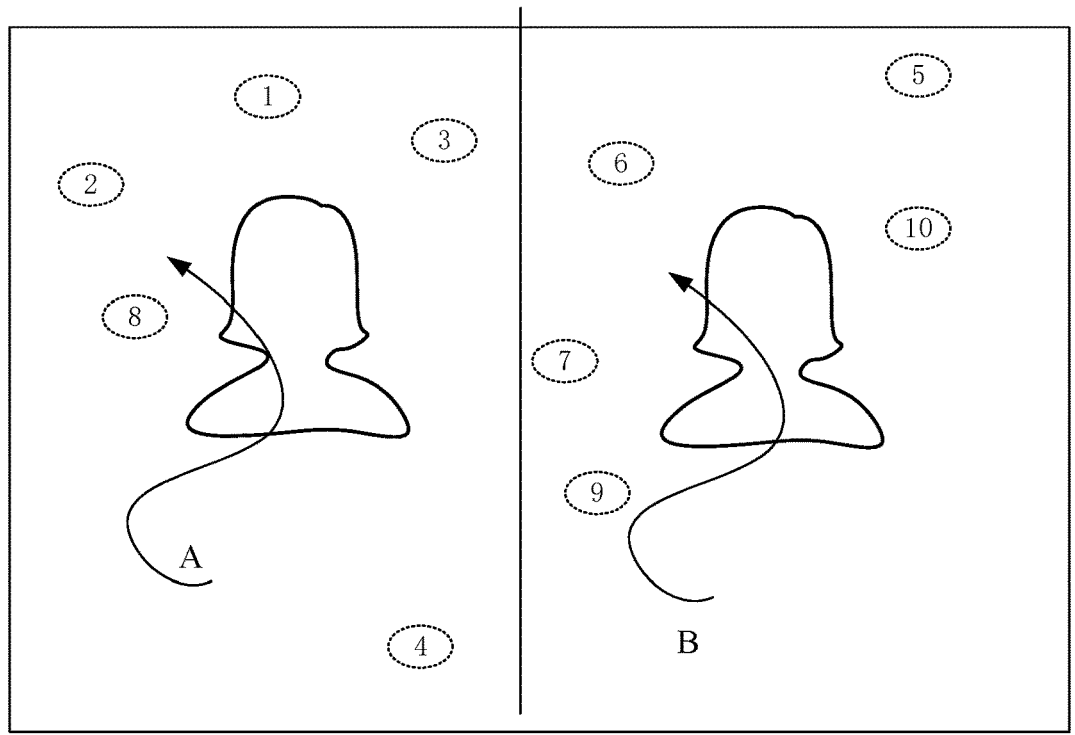
FIG. 9A to FIG. 9B are second example diagrams of displaying of a video merging interface provided by an embodiment of the present disclosure.
Figure 9B:
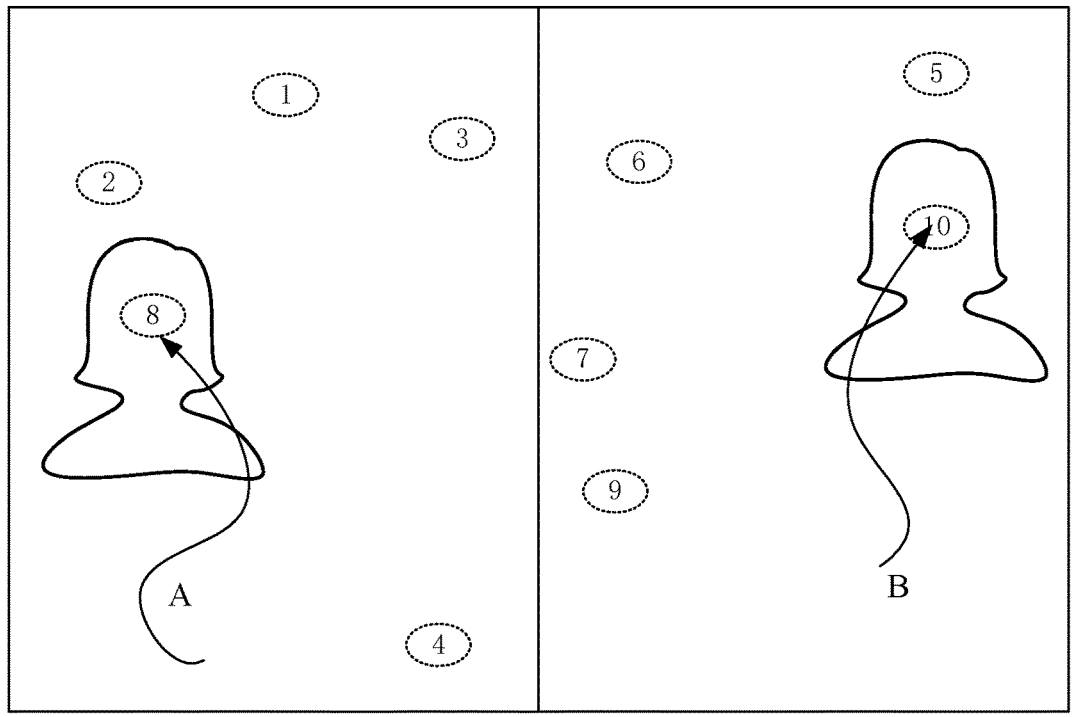

As shown in FIG. 9A and FIG. 9B, FIG. 9A and FIG. 9B are effect diagrams of a picture after the game elements in the game picture and the video pictures of the two live-streamers have been superimposed, and the superimposed picture includes the game elements of snake A and snake B, and a plurality of foods. FIG. 9A is an initial picture when the game begins, and the live-streamers move their heads according to positions of the foods, and the audio-video processing module continuously collects coordinates of the heads of the live-streamers and status information of the mouth parts on the heads, and sends the collected coordinate sequences and the status information of the mouths to the game server. The game server calculates, according to the coordinate calculating method described above, the movement distance and the movement direction of the heads of the live-streamers according to the coordinate sequences in real time, so as to control the movement distance and direction of the snake in real time. After a period of time, as shown in FIG. 9B, the head of the first live-streamer A moves to a food labeled as 8, and at the same time, the game server controls the snake A to move to a food labeled as 8, and simultaneously determines that the mouth of the first live-streamer is in an opened status, and then the game server controls the snake A to open its mouth and eat the food labeled as 8, and after the snake A eats the food, length of the body will increase. Similarly, at this period of time, the head of the second live-streamer B moves to a food labeled as 10, and the game server controls the snake B to move to the food labeled as 10 as the head of the second live-streamer moves, but at this time, the game server detects that the mouth of the second live-streamer is in a closed status, and then the mouth of the snake B is also in a closed status, and at this time the snake B will not eat the food labeled as 10. Finally, the game server determines a game result of the two live-streamers according to lengths of the two snakes.

It shall be noted that, after the snake eats the food, increased body length may be different according to different foods, and the foods in the game may appear randomly, or may be foods generated according to gifts sent by audience when viewing the live-broadcast.

In the embodiment of the present disclosure, game elements are controlled according to action information of live-streamers, which not only increases fun of the game manipulated by main live-streamers, but also improves viewing experience of the audience.

Figure 10:
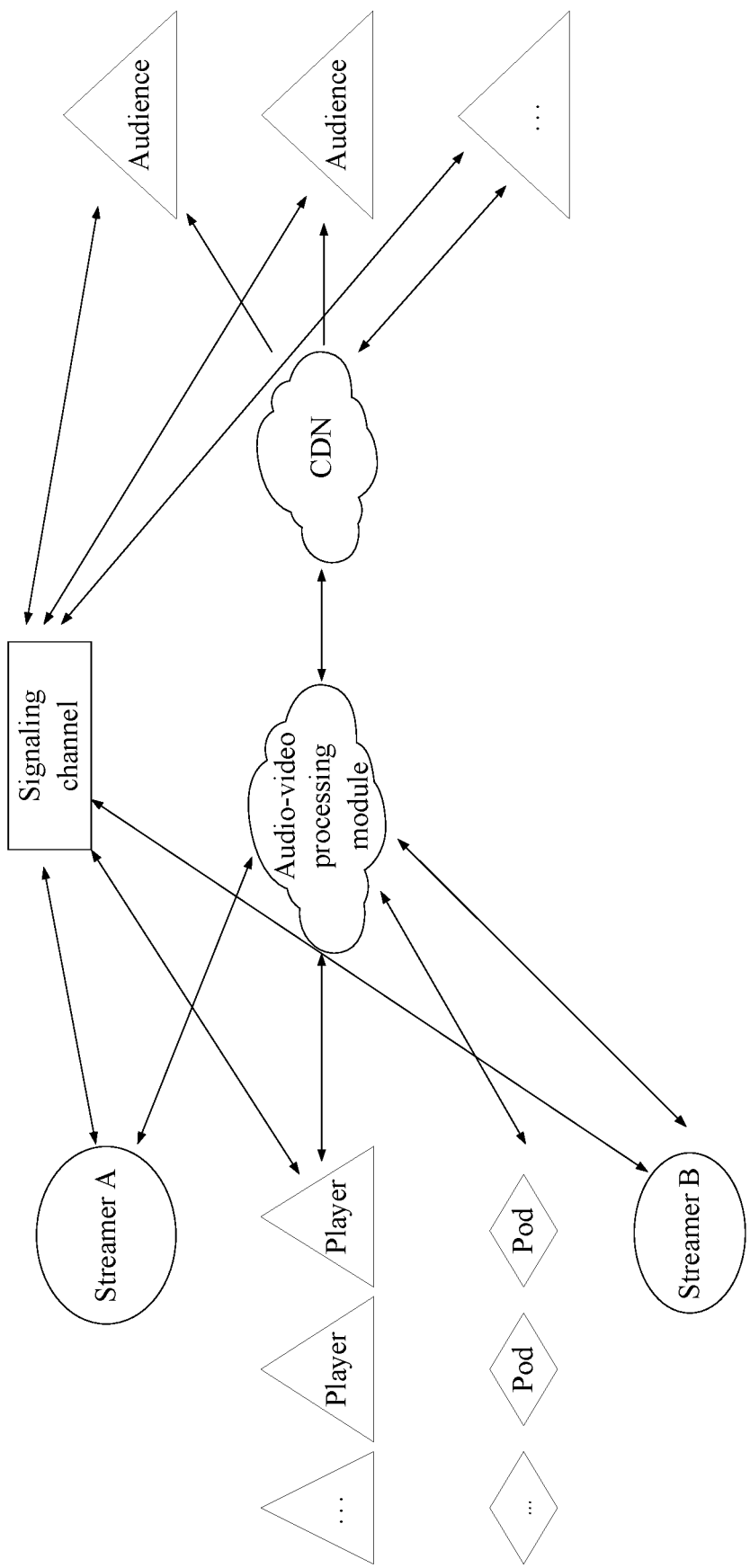
FIG. 10 is a schematic diagram of a game live-broadcast interaction mode provided by an embodiment of the present disclosure.

FIG. 10 is a schematic diagram of a game live-broadcast interaction mode provided by an embodiment of the present disclosure. The present embodiment describes the process of game connection, live-broadcast and interaction with reference to a streamer end, a player end, a game server, an audio-video processing module and an audience end.

As shown in FIG. 10, the schematic diagram of the model includes a plurality of game servers (referred to as Pods), a plurality of game player ends, two live-streamers which are streamer A and streamer B respectively, an audio-video processing module, and a plurality of audience ends.

Both the players and streamers can manipulate the game, and the audio-video processing module is used for services of real-time transmission and video merging of audio-video communication media, for example, game manipulation instructions of the players and the streamers are sent to corresponding Pods through the audio-video processing module, and the audio-video processing module transmits the game picture to the streamer ends and player ends, and simultaneously sends the video pictures of the streamers to the player ends and other streamer ends, and the audio-video processing module may also merge the game picture and the video pictures of players and/or streamers, and send the pictures obtained by merging to a network distribution node (CDN), and the merged picture is distributed to respective audience ends through the CDN. At the same time, the streamer ends, the player ends and the audience ends interact with signaling information through a signaling channel.

Figure 11:
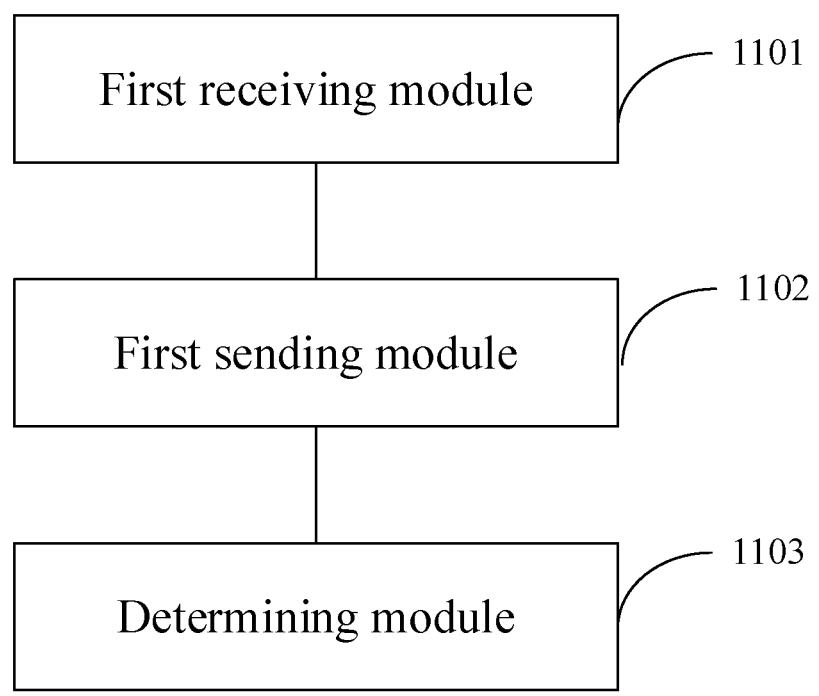
FIG. 11 is a first schematic structural diagram of a game live-broadcast interaction apparatus provided by an embodiment of the present disclosure.

FIG. 11 is a first schematic structural diagram of a game live-broadcast interaction apparatus provided by an embodiment of the present disclosure.

As shown in FIG. 11, the apparatus provided by the embodiment of the present disclosure includes: a first receiving module 1101, a first sending module 1102 and a determining module 1103; where the first receiving module 1101 is configured to receive a game picture sent by a game server; the first sending module 1102 is configured to send the game picture to a terminal of a first user; the first receiving module is further configured to receive a video picture of the first user collected by the terminal, where the video picture includes a corresponding action performed by the first user according to game elements in the game picture; the determining module 1103 is configured to determine action information according to the video picture, and the first sending module 1102 is further configured to send the action information to the game server, to cause the game server to control the game elements in the game picture according to the action information; and the first sending module 1102 is further configured to merge the game picture and the video picture, and send a picture generated by merging to a terminal for display.

The apparatus provided by the present embodiment can be used to perform the technical solutions of the above method embodiments, and the implementation principle and the technical effect are similar, which will not be repeated here in the present embodiment.

Figure 12:
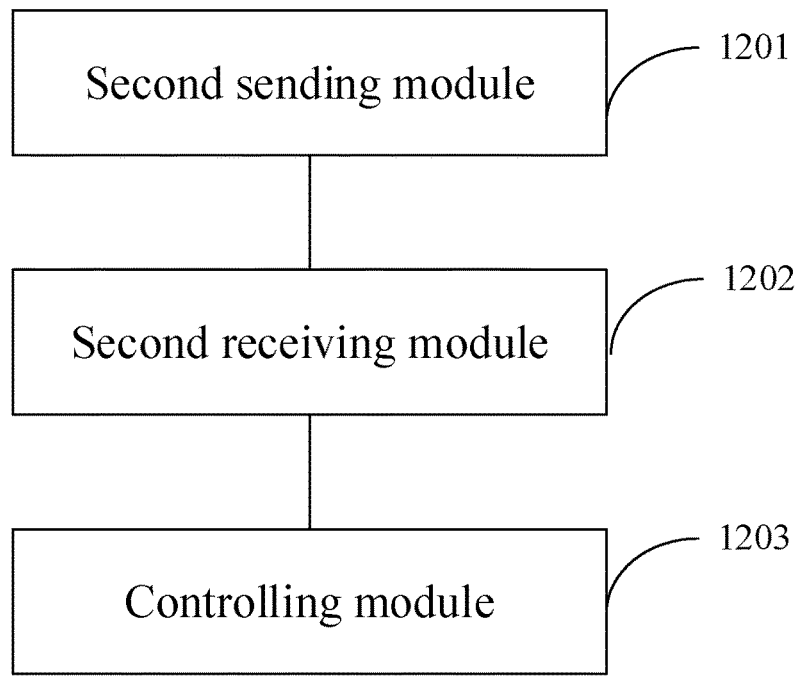
FIG. 12 is a second schematic structural diagram of a game live-broadcast interaction apparatus provided by an embodiment of the present disclosure.

FIG. 12 is a second schematic structural diagram of a game live-broadcast interaction apparatus provided by an embodiment of the present disclosure.

As shown in FIG. 12, the apparatus provided by the embodiment of the present disclosure includes: a second sending module 1201, a second receiving module 1202 and a controlling module 1203; where the second sending module 1201 is configured to send a game picture to an audio-video processing module, to cause the audio-video processing module to receive the game picture and send the game picture to a terminal; the second receiving module 1202 is configured to receive action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture; and the controlling module 1203 is configured to control the game elements according to the action information.

The apparatus provided by the present embodiment can be used to perform the technical solutions of the above method embodiments, and the implementation principle and the technical effect are similar, which will not be repeated here in the present embodiment.

Figure 13:
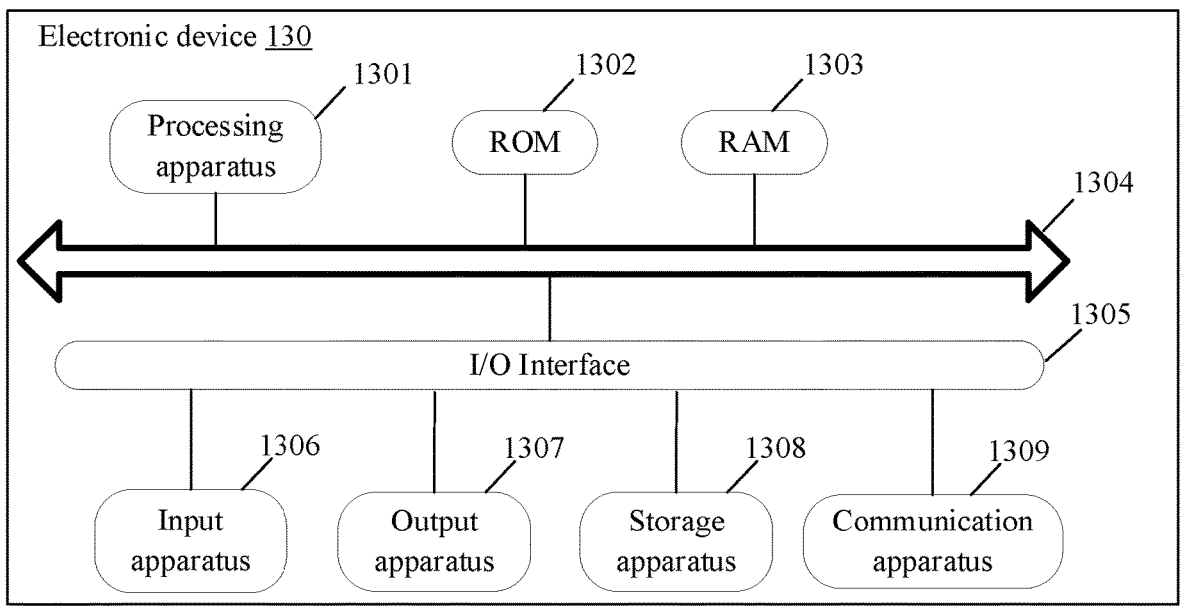
FIG. 13 is a schematic hardware structural diagram of an electronic device provided by an embodiment of the present disclosure.

As shown in FIG. 13, FIG. 13 shows a schematic structural diagram of an electronic device 130 used to implement embodiments of the present disclosure, and the electronic device 130 may be a terminal device or a server. The terminal device may include, but is not limited to, mobile terminals such as mobile phones, notebook computers, digital broadcast receivers, personal digital assistants (PDA), portable android devices (PAD), portable media players (PMP), vehicle-mounted terminals (e.g., vehicle navigation terminals), and fixed terminals such as digital TVs and desktop computers. The electronic device shown in FIG. 13 is merely an example, which shall not bring any limitation to the functions and application scope of the embodiments of the present disclosure.

As shown in FIG. 13, the electronic device 130 may include a processing apparatus 1301 (such as a central processing unit, a graphics processing unit), which may perform various appropriate actions and processing according to a program stored in a read only memory 902 (ROM) or a program loaded into a random access memory 1303 (RAM) from a storage apparatus 1308. In the RAM 1303, various programs and data required for the operation of the electronic device 130 are also stored. The processing apparatus 1301, ROM 1302, and RAM 1303 are connected to each other through a bus 1304. An input/output (I/O) interface 1305 is also connected to the bus 1304.

Generally, the following apparatuses may be connected to the I/O interface 1305: an input apparatus 1306 including, for example, a touch screen, a touch panel, a keyboard, a mouse, a camera, a microphone, an accelerometer, a gyroscope, etc.; an output apparatus 1307 including, for example, a liquid crystal display (LCD), a speaker, a vibrator, etc.; a storage apparatus 1308 including a magnetic tape, a hard disk, etc.; and a communication apparatus 1309. The communication apparatus 1309 may allow the electronic device 130 to perform wireless or wired communication with other devices to exchange data. Although FIG. 13 shows the electronic device 130 with various apparatuses, it should be understood that it is not required to implement or have all the apparatuses shown. More or fewer apparatuses may be implemented or provided instead.

Particularly, according to the embodiments of the present disclosure, the process described above with reference to the flowcharts may be implemented as a computer software program. For example, embodiments of the present disclosure include a computer program product, which includes a computer program carried on a computer-readable medium, and the computer program contains program codes for performing the method shown in the flowcharts. In such embodiment, the computer program may be downloaded and installed from the network through the communication apparatus 1309, or installed from the storage apparatus 1308 or the ROM 1302. When the computer program is executed by the processing apparatus 1301, it performs the above functions defined in the method according to the embodiments of the present disclosure.

It should be noted that the above-mentioned computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or component, or any combination of the above. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage component, a magnetic storage component, or any suitable combination of the above. In the present disclosure, the computer-readable storage medium may be any tangible medium that contains or stores a program that can be used by or in connection with an instruction execution system, apparatus or device. In the present disclosure, the computer-readable signal medium may include data signals propagated in a baseband or as part of a carrier wave, in which computer-readable program codes are carried. This propagated data signal may take various forms, including but not limited to an electromagnetic signal, an optical signal or any suitable combination of the above. The computer-readable signal medium may also be any computer-readable medium other than the computer-readable storage medium, and the computer-readable signal medium can send, propagate or transmit a program for use by or in connection with the instruction execution system, apparatus or device. The program codes contained on the computer-readable medium may be transmitted by any suitable medium, including but not limited to: an electric wire, an optical cable, radio frequency (RF), etc., or any suitable combination of the above.

The computer-readable medium may be included in the electronic device; or it may exist separately without being assembled into the electronic device.

The computer-readable medium carries one or more programs which, when executed by the electronic device, cause the electronic device to perform the method shown in the above embodiments.

Computer program codes for performing the operations of the present disclosure may be written in one or more programming languages or their combinations, including object-oriented programming languages such as Java, Smalltalk, C++, and conventional procedural programming languages such as "C" language or similar programming languages. The program may be executed completely on a user computer, partially on a user computer, as an independent software package, partially on a user computer and partially on a remote computer, or completely on a remote computer or a server. In the case of a remote computer, the remote computer may be connected to a user computer through any kind of networks, including a local area network (LAN) or a wide area network (WAN), or may be connected to an external computer (for example, using an Internet service provider to connect through the Internet).

The flowcharts and block diagrams in the accompanied drawings illustrate the system architecture, functions and operations of possible implementations of systems, methods and computer program products according to various embodiments of the present disclosure. In this regard, each block in the flowcharts or block diagrams may represent a module, a program segment, or a part of code, and the module, the program segment, or the part of code contains one or more executable instructions for implementing a specified logical function. It should also be noted that in some alternative implementations, the functions marked in the blocks may also occur in a different order than those marked in the drawings. For example, two consecutive blocks may actually be executed basically in parallel, and sometimes they may be executed in reverse order, depending on the functions involved. It should also be noted that each block in the block diagrams and/or flowcharts, and the combination of blocks in the block diagrams and/or flowcharts, may be implemented by a dedicated hardware-based system that performs specified functions or operations, or may be implemented by a combination of dedicated hardware and computer instructions.

The units involved in the embodiments described in the present disclosure may be implemented by software or hardware. The name of a unit does not constitute a restriction on the unit itself in some cases.

The functions described above may be at least partially performed by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that can contain or store a program for use by or in connection with an instruction execution system, apparatus or device. The machine-readable medium may be a machine-readable signal medium or a machine-readable storage medium. The machine-readable medium may be, for example, but not limited to, an electronic, magnetic, optical, electromagnetic, infrared, or semiconductor system, apparatus or device, or any suitable combination of the above. More specific examples of the machine-readable storage medium include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

The embodiments of the present disclosure also provide a computer program, and when the computer program is executed by a processor, the game live-broadcast interaction method provided by any of the above embodiments is performed.

In a first aspect, a game live-broadcast interaction method is provided according to one or more embodiments of the present disclosure, including:
  receiving a game picture sent by a game server;
  sending the game picture to a terminal of a first user;
  receiving a video picture of the first user collected by the terminal, where the video picture includes a corresponding action performed by the first user according to game elements in the game picture;
  determining action information according to the video picture, and sending the action information to the game server, to cause the game server to control the game elements in the game picture according to the action information; and
  merging the game picture and the video picture, and sending a picture generated by merging to a terminal for display.

According to one or more embodiments of the present disclosure, the determining the action information according to the video picture includes:
  collecting limb position information of the first user at a preset time interval to obtain a coordinate sequence of limbs of the first user in video pictures.

According to one or more embodiments of the present disclosure, the sending the action information to the game server, to cause the game server to control the game elements in the game picture according to the action information includes:
  sending the coordinate sequence of the limbs of the first user relative to the video picture to the game server, to cause the game server to determine motion trajectories of the game elements according to the coordinate sequence.

According to one or more embodiments of the present disclosure, the determining the action information according to the video picture includes:
  detecting status information of a target part of the first user.

According to one or more embodiments of the present disclosure, the sending the action information to the game server to cause the game server to control the game elements in the game picture according to the action information includes:

sending the status information of the target part to the game server, to cause the game server to control, according to the status information of the target part, a first game element of the game elements to perform an action indicated by the status information.

According to one or more embodiments of the present disclosure, the merging the game picture and the video picture includes:

extracting the game elements in the game picture; and
superimposing the game elements and the video picture.

According to one or more embodiments of the present disclosure, the extracting the game elements in the game picture includes:

setting a background color of the game picture as a preset color; and
extracting elements with a different color from the preset color in the game picture as the game elements.

According to one or more embodiments of the present disclosure, a number of the terminal is at least two; and the method further includes:

receiving a game connection request sent by a first terminal; and
matching up at least one other terminal according to the game connection request.

According to one or more embodiments of the present disclosure, the merging the game picture and the video picture, and sending a picture generated by merging to the terminal for display includes:

merging video pictures of at least two terminals, and sending a merged video picture and the game picture to the terminal respectively, to cause the terminal to display the merged video picture and the game picture; or,
superimposing the video pictures of the at least two terminals and the game picture, and sending a superimposed picture to the terminal for display.

In a second aspect, a game live-broadcast interaction method is provided according to one or more embodiments of the present disclosure, including:

sending a game picture to an audio-video processing module, to cause the audio-video processing module to receive the game picture and send the game picture to a terminal;
receiving action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture; and
controlling the game elements according to the action information.

According to one or more embodiments of the present disclosure, the method further includes:

receiving a coordinate sequence of limbs of the first user relative to the video picture sent by the audio-video processing module, where the coordinate sequence is obtained by the audio-video processing module through collecting limb position information of the first user according to the video picture at a preset time interval; and
determining motion trajectories of the game elements according to the coordinate sequence of the limbs of the first user relative to the video picture.

According to one or more embodiments of the present disclosure, the determining the motion trajectories of the game elements according to the coordinate sequence of the limbs of the first user relative to the video picture includes:

calculating a difference between an abscissa at a latter moment and an abscissa at a previous moment respectively, to obtain horizontal movement information of the limbs of the first user, where the horizontal movement information includes a horizontal movement distance and a horizontal movement direction, and, calculating a difference between an ordinate at a latter moment and an ordinate at a previous moment respectively, to obtain vertical movement information of the limbs of the first user, where the vertical movement information includes a vertical movement distance and a vertical movement direction; and
determining the motion trajectories of the game elements according to the horizontal movement information and the vertical movement information.

According to one or more embodiments of the present disclosure, the method further includes:

receiving status information of a target part of the first user sent by the audio-video processing module; and
controlling, according to the status information of the target part, a first game element of the game elements to perform an action indicated by the status information.

In a third aspect, a game live-broadcast interaction apparatus is provided according to one or more embodiments of the present disclosure, including:

a first receiving module, configured to receive a game picture sent by a game server;
a first sending module, configured to send the game picture to a terminal of a first user;
the first receiving module further configured to receive a video picture of the first user collected by the terminal, where the video picture includes a corresponding action performed by the first user according to game elements in the game picture;
a determining module, configured to determine action information according to the video picture, where the first sending module is further configured to send the action information to the game server, to cause the game server to control the game elements in the game picture according to the action information; and
the first sending module further configured to merge the game picture and the video picture, and send a picture generated by merging to a terminal for display.

According to one or more embodiments of the present disclosure, the determining module is specifically configured to:

collect limb position information of the first user at a preset time interval to obtain a coordinate sequence of limbs of the first user in the video picture.

According to one or more embodiments of the present disclosure, the first sending module is specifically configured to:

send the coordinate sequence of the limbs of the first user relative to the video picture to the game server to cause the game server to determine motion trajectories of the game elements according to the coordinate sequence.

According to one or more embodiments of the present disclosure, the determining module is specifically configured to:

detect status information of a target part of the first user.

According to one or more embodiments of the present disclosure, the first sending module is specifically configured to:

send the status information of the target part to the game server to cause the game server to control, according to the status information of the target part, a first game element of the game elements to perform an action indicated by the status information.

According to one or more embodiments of the present disclosure, the first sending module is specifically configured to:

extract the game elements in the game picture; and superimpose the game elements and the video picture.

According to one or more embodiments of the present disclosure, the first sending module is specifically configured to:

set a background color of the game picture as a preset color;

extract elements with a different color from the preset color in the game picture as the game elements.

According to one or more embodiments of the present disclosure, a number of the terminal is at least two; the first receiving module is further configured to:

receive a game connection request sent by a first terminal; and match up at least one other terminal according to the game connection request.

According to one or more embodiments of the present disclosure, the first sending module is specifically configured to: merge video pictures of at least two terminals, and send a merged video picture and the game picture to the terminal respectively, to cause the terminal to display the merged video picture and the game picture;

or, superimpose the video pictures of the at least two terminals and the game picture, and send a superimposed picture to the terminal for display.

In a fourth aspect, a game live-broadcast interaction apparatus is provided according to one or more embodiments of the present disclosure, including:

a second sending module, configured to send a game picture to an audio-video processing module, to cause the audio-video processing module to receive the game picture and send the game picture to a terminal;

a second receiving module, configured to receive action information of a first user sent by the audio-video processing module, where the action information is determined according to a video picture, the video picture is a video picture of the first user collected and sent to the audio-video processing module by the terminal, and the video picture includes a corresponding action performed by the first user according to game elements in the game picture; and a controlling module, configured to control the game elements according to the action information.

According to one or more embodiments of the present disclosure, the second receiving module is specifically configured to:

receive a coordinate sequence of limbs of the first user relative to the video picture sent by the audio-video processing module, where the coordinate sequence is obtained by the audio-video processing module through collecting limb position information of the first user according to video pictures at a preset time interval; and the controlling module is specifically configured to: determine motion trajectories of the game elements according to the coordinate sequence of the limbs of the first user relative to the video pictures.

According to one or more embodiments of the present disclosure, the controlling module is specifically configured to:

calculate a difference between an abscissa at a latter moment and an abscissa at a previous moment respectively, to obtain horizontal movement information of the limbs of the first user, where the horizontal movement information includes a horizontal movement distance and a horizontal movement direction, and calculate a difference between an ordinate at a latter moment and an ordinate at a previous moment respectively, to obtain vertical movement information of the limbs of the first user, where the vertical movement information includes a vertical movement distance and a vertical movement direction; and determine the motion trajectories of the game elements according to the horizontal movement information and the vertical movement information.

According to one or more embodiments of the present disclosure, the second receiving module is specifically configured to: receive status information of a target part of the first user sent by the audio-video processing module; and the controlling module is specifically configured to: control, according to the status information of the target part, a first game element of the game elements to perform an action indicated by the status information.

In a fifth aspect, according to one or more embodiments of the present disclosure, an electronic device is provided, including: at least one processor and a memory;

the memory stores a computer-executable instruction;

the at least one processor executes the computer-executable instruction stored in the memory, to cause the at least one processor to perform the game live-broadcast interaction method according to the first aspect and various possible designs thereof or the game live-broadcast interaction method according to the second aspect and various possible designs thereof.

In a sixth aspect, according to one or more embodiments of the present disclosure, a computer-readable storage medium is provided, where the computer-readable storage medium stores a computer-executable instruction, and when a processor executes the computer-executable instruction, the game live-broadcast interaction method according to the first aspect and various possible designs thereof or the game live-broadcast interaction method according to the second aspect and various possible designs thereof is implemented.

In a seventh aspect, according to one or more embodiments of the present disclosure, a computer program product is provided, including a computer program carried on a computer-readable medium, and when the computer program is executed by a processor, the game live-broadcast interaction method according to the first aspect and various possible designs thereof or the game live-broadcast interaction method according to the second aspect and various possible designs thereof is implemented.

In an eighth aspect, according to one or more embodiments of the present disclosure, a computer program is provided, and when the computer program is executed by a processor, the game live-broadcast interaction method according to the first aspect and various designs thereof or the game live-broadcast interaction method according to the second aspect and various designs thereof is performed.

The above description is only preferred embodiments of the present disclosure and the description of the applied technical principle. It should be understood by those of ordinary skills in the art, the disclosure scope involved in the present disclosure is not limited to the technical solution formed by the specific combination of the above technical features, but also covers other technical solutions formed by any combination of the above technical features or their equivalent features without departing from the above disclosed concept. For example, technical solutions formed by replacing the above features with (but not limited to) technical features with similar functions disclosed in the present disclosure.

In addition, although various operations are described in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of one single embodiment may also be implemented in multiple embodiments independently or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

What is claimed is:

1. A game live-broadcast interaction method, wherein the method comprises:
   receiving a game picture sent by a game server;
   sending the game picture to a terminal of a first user;
   receiving a video picture of the first user collected by the terminal, wherein the video picture comprises a corresponding action performed by the first user according to game elements in the game picture;
   determining action information according to the video picture, and sending the action information to the game server to cause the game server to control the game elements in the game picture according to the action information; and
   merging the game picture and the video picture, and sending a picture generated by merging to a terminal for display,
   wherein merging the game picture and the video picture comprises:
      extracting the game elements in the game picture; and
      superimposing the game elements and the video picture.

2. The method according to claim 1, wherein the determining the action information according to the video picture comprises:
   collecting limb position information of the first user at a preset time interval to obtain a coordinate sequence of limbs of the first user in the video picture.

3. The method according to claim 2, wherein the sending the action information to the game server to cause the game server to control the game elements in the game picture according to the action information comprises:
   sending the coordinate sequence of the limbs of the first user relative to the video picture to the game server, to cause the game server to determine motion trajectories of the game elements according to the coordinate sequence.

4. The method according to claim 3, wherein the determining the action information according to the video picture comprises:
   detecting status information of a target part of the first user.

5. The method according to claim 2, wherein the determining the action information according to the video picture comprises:
   detecting status information of a target part of the first user.

6. The method according to claim 5, wherein the sending the action information to the game server to cause the game server to control the game elements in the game picture according to the action information comprises:
   sending the status information of the target part to the game server to cause the game server to control, according to the status information of the target part, a first game element of the game elements to perform an action indicated by the status information.

7. The method according to claim 1, wherein the determining the action information according to the video picture comprises:
   detecting status information of a target part of the first user.

8. The method according to claim 7, wherein the sending the action information to the game server to cause the game server to control the game elements in the game picture according to the action information comprises:
   sending the status information of the target part to the game server to cause the game server to control, according to the status information of the target part, a first game element of the game elements to perform an action indicated by the status information.

9. The method according to claim 1, wherein the extracting the game elements in the game picture comprises:
   setting a background color of the game picture as a preset color; and
   extracting elements with a different color from the preset color in the game picture as the game elements.

10. The method according to claim 1, wherein a number of the terminal is at least two; and the method further comprises:
    receiving a game connection request sent by a first terminal; and
    matching up at least one other terminal according to the game connection request.

11. The method according to claim 10, wherein the merging the game picture and the video picture, and sending the picture generated by merging to the terminal for display comprises:
    merging video pictures of at least two terminals, and sending a merged video picture and the game picture to the terminal respectively, to cause the terminal to display the merged video picture and the game picture; or,
    superimposing the video pictures of the at least two terminals and the game picture, and sending a superimposed picture to the terminal for display.

12. A game live-broadcast interaction method, wherein the method comprises:

sending a game picture to an audio-video processing module to cause the audio-video processing module to receive the game picture and send the game picture to a terminal;

receiving action information of a first user sent by the audio-video processing module, wherein the action information is determined according to a video picture, the video picture is a video picture of the first user collected and sent to the audio-video processing module by the terminal, and the video picture comprises a corresponding action performed by the first user according to game elements in the game picture;

controlling the game elements according to the action information;

receiving a coordinate sequence of limbs of the first user relative to video pictures sent by the audio-video processing module, wherein the coordinate sequence is obtained by the audio-video processing module through collecting limb position information of the first user according to the video pictures at a preset time interval; and determining motion trajectories of the game elements according to the coordinate sequence of the limbs of the first user relative to the video pictures.

13. The method according to claim 12, wherein the determining the motion trajectories of the game elements according to the coordinate sequence of the limbs of the first user relative to the video pictures comprises:

calculating a difference between an abscissa at a latter moment and an abscissa at a previous moment respectively, to obtain horizontal movement information of the limbs of the first user, wherein the horizontal movement information comprises a horizontal movement distance and a horizontal movement direction, and, calculating a difference between an ordinate at a latter moment and an ordinate at a previous moment respectively, to obtain vertical movement information of the limbs of the first user, wherein the vertical movement information comprises a vertical movement distance and a vertical movement direction; and determining the motion trajectories of the game elements according to the horizontal movement information and the vertical movement information.

14. The method according to claim 12, wherein the method further comprises:

receiving status information of a target part of the first user sent by the audio-video processing module; and controlling, according to the status information of the target part, a first game element of the game elements to perform an action indicated by the status information.

15. A game live-broadcast interaction apparatus, comprising:

at least one processor and a memory; wherein the memory stores a computer-executable instruction; and the at least one processor executes the computer-executable instruction stored in the memory to cause the at least one processor to:

receive a game picture sent by a game server;

send the game picture to a terminal of a first user;

receive a video picture of the first user collected by the terminal, wherein the video picture comprises a corresponding action performed by the first user according to game elements in the game picture;

determine action information according to the video picture, the first sending module further configured to send the action information to the game server to cause the game server to control the game elements in the game picture according to the action information; and merge the game picture and the video picture, and send a picture generated by merging to a terminal for display, wherein merging the game picture and the video picture comprises:

extracting the game elements in the game picture; and superimposing the game elements and the video picture.

* * * * *